Patented Nov. 12, 1929

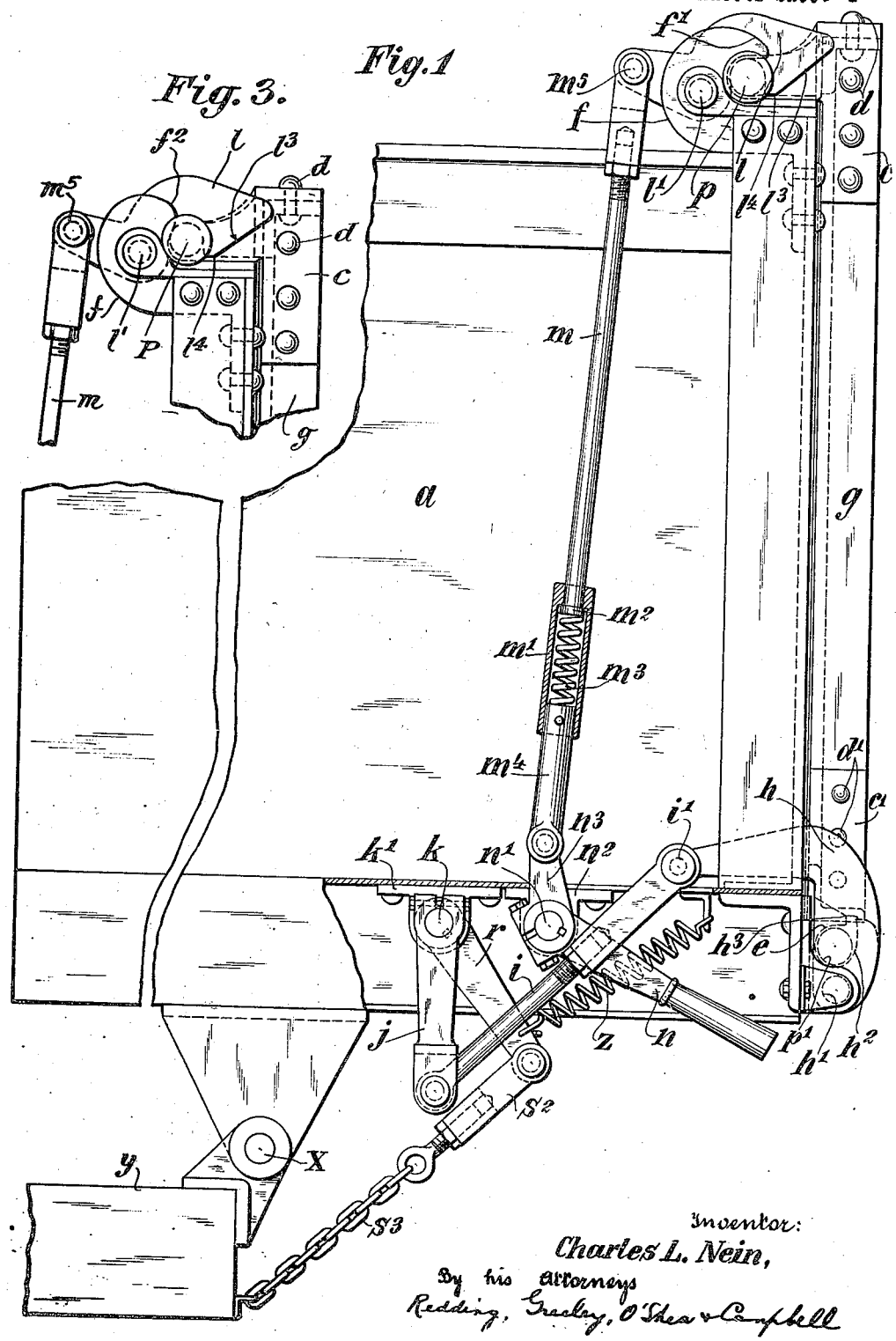

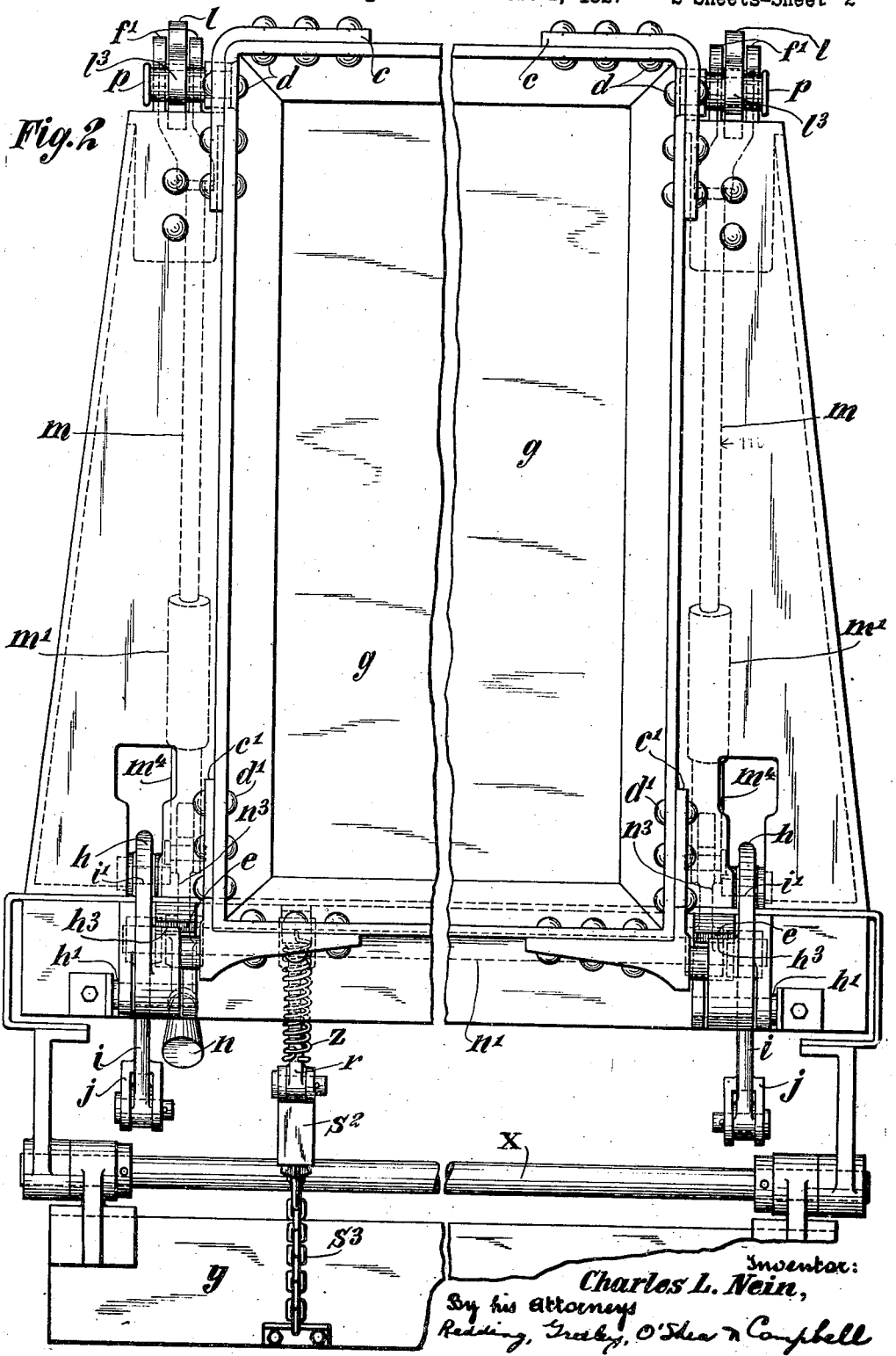

1,735,408

UNITED STATES PATENT OFFICE

CHARLES L. NEIN, OF ALLENTOWN, PENNSYLVANIA, ASSIGNOR TO INTERNATIONAL MOTOR COMPANY, OF NEW YORK, N. Y., A CORPORATION OF DELAWARE

DOUBLE-ACTING TAIL GATE FOR DUMP TRUCKS

Original application filed February 1, 1927, Serial No. 165,057. Divided and this application filed October 20, 1927. Serial No. 227,427.

This invention relates to tail gates for dump trucks and to hinging and locking means therefor of the type set forth and disclosed in my co-pending application Serial No. 165,057 filed February 1, 1927. This application relates specifically to the automatic means for releasing the bottom of the gate carried with the truck when the body of the truck is raised. It is proposed to provide what may be termed a double acting tail gate for use on dump trucks, for instance, which is held in position by means of specially designed hooks mounted upon the body of the truck and co-operating with pins carried at both upper and lower corners of the gate. According to the modification of the invention to which this application is particularly addressed the hooks which hold the top of the gate in position are provided with manually operable means to release the pins so that the gate may be swung downwardly while the hooks which hold the pins at the bottom of the gate in position are provided with means whereby the pins may be automatically released and the gate swung outwardly as the body of the truck is being raised. These means are, further, preferably of such a nature that when the body of the truck is lowered the hooks will automatically engage the pins and bring the gate into closed position.

For a complete understanding of the invention reference should be had to the following detailed description thereof and to the accompanying drawings in which:

Figure 1 is a view in side elevation of a tail gate according to this invention and showing the hooking means and actuating mechanism therefore; and Figure 2 is an end elevation of the same.

Figure 3 indicates a modification of the means for mounting the gate at its upper end.

In Figure 1 there is illustrated at $a$ the rear end of a dump truck body to which the tail gate $g$ is to be applied. There is fastened to each end of the top of the tail gate $g$ a pin $p$ by means of the brackets $c$ which are fixed upon the tail gate as by the rivets $d$. Pins $p'$ are similarly attached at each end of the bottom of the tail gate as by the brackets $c'$ and the rivets $d'$.

At each end of the top of the dump body are riveted the rests $f$ which are bifurcated as at $f', f'$. Between the bifurcated ends of the rests $f$ are pivoted locking hooks $l$ as by the pintle $l'$. At one end of the hook $l$ there is pinned a link $m$ as by the pin $m^5$. Over the end of the link $m$ is disposed the sleeve $m'$ which abuts against the end of the stop $m^2$ on the end of the link. Within the sleeve $m'$ is disposed a spring $m^3$ and in the end of the sleeve is pinned the link $m^4$ which is also pinned to one end of the bent lever handle $n$. The bent lever handle $n$ is keyed to the shaft $n'$ which is journaled in bearings $n^2$ at both sides under the body. At the other side of the body the shaft $n'$ is connected with the locking hook $l$ in an identical manner as that just described except that the handle lever $n$ may be omitted.

At both ends of the bottom of the dump body are riveted the rests $e$. The bent hooks $h$ are pinned at one side of the rests $e$ to the body by the pins $h'$. The bent hooks $h$ have portions $h^2$ formed on the inner side thereof for a purpose which will become more apparent hereinafter. To the other end of the bent hook $h$ is pinned the link $i$ as by the pin $i'$ and this link is in turn pinned to an arm $j$ keyed to the shaft $k$ which is journaled in bearings $k'$ carried with the body. The shaft $k$ also has keyed thereto the arm $r$ to which is pinned the buckle $s^2$ which is attached to a point on the chassis frame $y$ as by the chain $s^3$. The arm $r$ is held in the position indicated in the drawings against the action of the spring $z$ by the chain $s^3$, the spring $z$ tending to pull the arm $r$ to the right when the chain $s^3$ is slackened.

When the body is raised about its pivot point $x$ the rearward part of the body will move downwardly releasing the tension on the chain $s^3$ and allowing the spring $z$ to pull the arm $r$ to the right, thereby turning the shaft $k$. The arms $j$ will move to the right as the shaft $k$ turns thereby releasing the pins $p'$ by swinging the hooks $h$ about the pivots $h'$ through the rod $i$. The gate, as will be apparent, will swing outwardly of its own accord about the pins $p$ at the top. When the body is lowered about its pivot $x$ the gate will close automatically, the chain $s^3$ pulling the link $r$ downwardly, the parts being so arranged that the hooks $h$ resume the position shown in Figure 1 as the pins $p'$ drop into position against the rests $e$. As the gate is closing and when it is in almost closed position the relation of parts is such that the edges $h^2$ on the hooks $h$ will come into contact with the pins $p'$ and force the gate into completely closed position.

If it is desired to open the tail gate by releasing the top all that is necessary is to pull downwardly on the handle $n$. This will swing the hooks $l$ about the pivots $l'$ releasing the pins $p$ at the top of the gate and permitting the latter to swing downwardly about the pins $p'$ at the bottom. When it is desired to close the gate the hooks $l$ may be returned to locking position first and the gate then swung upwardly. The pins $p$ will press against the inclined edges $l^3$ of the hooks raising the latter against the action of the spring $m^3$ and permitting the pins $p$ to pass beneath the point $l^4$ and into position. The hooks will then snap back into locking position due to the action of the springs $m^3$. It will be noted that the hooks $l$ are prevented from inadvertently releasing the pins $p$, except when the handle $n$ is pulled downwardly, due to the "past center" condition of the links $m$ and the arms $n^3$ which thus forms an effective locking means.

It frequently happens in using dump bodies that while the tail gate is open at the bottom the truck is inadvertently backed into a wall or portion of the dumped load, the gate being forced upwardly. In order to prevent breakage of the pins $p$ or the hooks $l$ or the rests $f$, the rests $f$ may be formed as indicated in Figure 3, at $f^2$ so that the gate may be forced upwardly, the hooks $l$ yielding to the extent permitted by the spring $m^3$, and thus preventing breakage.

It will thus be seen that there has been provided for use on dump truck bodies a double acting tail gate which may be swung either upwardly or downwardly according to which of the sets of pins ordinarily used to retain it in place have been released; in which a simple, manually controlled releasing means has been supplied for the locking devices used to retain the pins on the top of the gate in place and which means may act as snap catches; and in which automatic means have been provided for releasing the means to ordinarily retain the pins carried with the bottom of the gate in place as the body of the truck is being raised. There have also been provided means for locking the hook releasing mechanism as well as means to prevent breakage of the parts at the top of the gate when subjected to undue stresses during unloading. The entire arrangement is simple, durable and easy to operate.

Nothing that has been said in the specification is intended as a limitation upon the scope of the invention except as indicated in the appended claim.

What I claim is:

Means for mounting a tail gate on a truck body, comprising in combination a pin on the tail gate near the top thereof, a rest for the pin mounted rigidly on the body, said rest comprising horizontal and vertical portions, a hook pivoted on the body, and means to swing the hook about its pivot to secure the pin against the rest, said means comprising a resilient member to receive forces exerted upon said hook incident to movement of the pin, whereby breakage is prevented.

This specification signed this 4th day of August, A. D. 1927.

CHARLES L. NEIN.